Dec. 16, 1969   M. MELONI   3,483,956
COIN CONTROLLED TICKET PRINTER CIRCUIT
Filed Nov. 20, 1967   3 Sheets-Sheet 1

Inventor:
MARIO MELONI
BY Brady, O'Boyle & Gates
ATTORNEYS

Inventor:
MARIO MELONI

Dec. 16, 1969    M. MELONI    3,483,956
COIN CONTROLLED TICKET PRINTER CIRCUIT
Filed Nov. 20, 1967    3 Sheets-Sheet 3

Inventor:
MARIO MELONI
BY Brady, O'Boyle & Gates
ATTORNEYS

United States Patent Office 3,483,956
Patented Dec. 16, 1969

3,483,956
COIN CONTROLLED TICKET PRINTER CIRCUIT
Mario Meloni, Bern, Switzerland, assignor to Autelca AG, Gumligen, Bern, Switzerland
Filed Nov. 20, 1967, Ser. No. 684,113
Claims priority, application Switzerland, Feb. 24, 1967, 2,740/67
Int. Cl. G07b *1/00;* G07f *11/00*
U.S. Cl. 194—10                                9 Claims

ABSTRACT OF THE DISCLOSURE

A ticket printer circuit with a first keyboard for selecting ticket destination by depressing a key corresponding to the destination, a second keyboard for selecting the type of ticket desired by depressing the appropriate key, switching circuits controlled by the different keyboards to energize selected outputs, and a combining circuit, for determining the predetermined fare wired into the circuit, for the selected combination of destination key and kind of ticket key, and for controlling a fare printing mechanism and fare indicating device. The circuit can be coin-controlled and provided with a device for indicating the difference between the amount of the fare and the amount of the coins inserted, and can be provided with a change return device.

BACKGROUND OF THE INVENTION

A known prior art ticket printer has exchangeable printing plates, on the bottom side of which are arranged stops for setting the fare printing mechanism, which have to be changed in case of ticket charge rate changes.

Another known ticket printer has for each destination as many keys as there are kinds of tickets for each destination (for instance, one way, return, for first and second class at full price and at reduced price).

The object of the present invention is to facilitate and speed up the operation of a ticket printer and its resetting in case of rate changes, to thus overcome the disadvantage of the prior art printers.

SUMMARY OF THE INVENTION

The ticket printing circuit according to the invention has a first selecting device for the ticket destination, a second selecting device for the kind of ticket and a circuit controlled by these selecting devices for the determination of the fare which is predetermined for the selected combination of destination and kind of ticket settings of the side devices, as well as for the control of the fare printing mechanism.

In a first form of the invention the circuit for the determination of the fare has an output for each unit of each decade of the fare and contains first make contacts which are controllable by one of the selecting devices and are individually assigned to their positions. Each of these first make contacts is connected on one side, to a common current source and, on the other side, via second make contacts, which are controlable by the other selecting device and are assigned to their positions, with those circuit outputs which correspond to the fare for the combination of the associated set positions of the selecting devices.

In a preferred second form of the machine control circuit, according to the invention, the circuit for the determination of the fare has a first and a second assignment circuit, and a circuit to carry out multiplication. The first assignment circuit has an output for each unit of each decade of the multiplication factors associated with the destinations for the calculation of the fare. The second assignment circuit has an output for each unit of each decade of the multiplication factors associated with the kind of ticket for the calculation of the fare. Each of the assignment circuits has make contacts controllable by one of the selecting devices, which contacts in the case of the first assignment circuit are assigned to the positions of the first selecting device, and in the case of the second assignment circuit, to the positions of the second selecting device and are conected, on the one side, to a current source and on the other, with those circuit outputs which correspond to the multiplication factor for the calculation of the fare predetermined for the assigned position. The outputs of the assignment circuits are connected to the inputs of the circuit for performing multiplication, the outputs of which control the fare printing mechanism.

BRIEF DESCRIPTION OF THE DRAWINGS

In the drawings are shown examples of the ticket printer control circuit according to the invention, limited to the parts essential in the present context.

Figure 1:
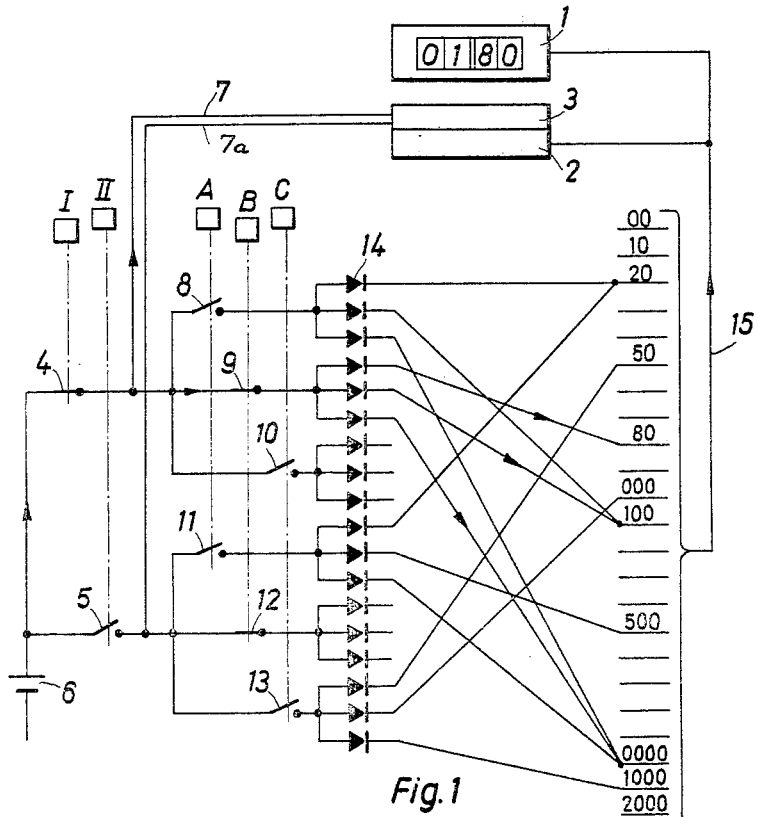
FIG. 1 is a partial electrical schematic of a first form of the invention.

The ticket printer according to FIG. 1 has a first selection keyboard with a group of keys I, II, and other keys not shown, for the selection of the destination for which the ticket is printed, and a second selection keyboard with a group of keys A, B, C, and other keys of the group not shown, for the selection of the kind of ticket to be printed, as well as a circuit controlled by these selection keyboards for determination of the fare predetermined for the selected combination of destination and kind of ticket keys that are actuated. This circuit controls an indicating device 1 for presenting a visual indication of the fare and controls the fare printing mechanism 2. The keyboard I, II, etc., controls the ticket destination printing mechanism 3.

The circuit for the determination of the fare is shown completely, for clarity in illustration and description, only for the combinations which correspond to the keys I, A; I, B; II, A; II, C; and the make-contact switches which are operable by the keys are illustrated in the position in which the keys I and B are depressed and the combination associated with these keys of destination and kind of ticket is thereby selected. The contact switches for the remaining keys are shown in the positions corresponding to the non-depressed positions of the keys.

The circuit shown has an output 00 to 2000 for each unit of each decade of the ticket fare, assuming that the smallest unit of the fare is Fr. 0.10 and the highest fare occurring does not exceed Fr. 29.90. For purposes of illustration the circuit is described with respect to fares in francs but it is understood the circuit is also operable with denominations of U.S. currency and currency of other countries. The circuit has first make-contact switches 4 and 5, each of which is assigned to a position of the selection keyboard I, II, i.e., is operable by means of the key I or II, respectively. Each of the normally open contacts 4 and 5 is connected on one side to the common current source 6, on the other side to a control line 7 or 7a, etc., respectively, for the control of the destination printing mechanism 3 and to branch circuits, each of which contains a set of second normally open make-contact switches 8, 9, 10 and 11, 12, 13, respectively. Each corresponding second make-contact switch of each set of second make-contact switches is assigned to a position of the selection keyboard A, B, C, etc. Consequently, the contacts 8 and 11 are operable by means of the key A, the contacts 9 and 12 by means of the key B, and the contacts 10 and 13 by means of the key C, and so on, for the other contacts and keys not shown. Each of the branch circuits containing the second make-contacts is connected via diodes 14 with those circuit outputs which correspond to the fare for that combination of destination and kind of ticket to which the corresponding positions of the two selecting devices are assigned. For example, it is assumed in FIG. 1 that the fare for the combination I, A is Fr. 1.20, for the combination I, B, Fr. 1.80, for the combination II, A, Fr. 5.20, and for the combination II, C, Fr. 10.50.

With the combination selected by pushing the keys I and B, the current flows from the current source 6 through the closed contacts 4 and 9, and the diodes 14 connected with them to the outputs 80, 100 and 0000, designating the fare of Fr. 1.80. The corresponding fare information is transmitted via the conductors 15, to the indicating device 1 and the ticket fare printing mechanism 2.

The effect of the diodes 14 is that only those wires are connected with each other, in the conducting state, which are connected to the current-carrying branches that lead to the circuit outputs. Without these diodes, not only the outputs 80, 100 and 0000, but also the outputs 20 and 500, would be supplied with current if in FIG. 1 the contacts 4 and 9, for instance, are closed, and it would be impossible to determine the proper fare.

Figure 2:
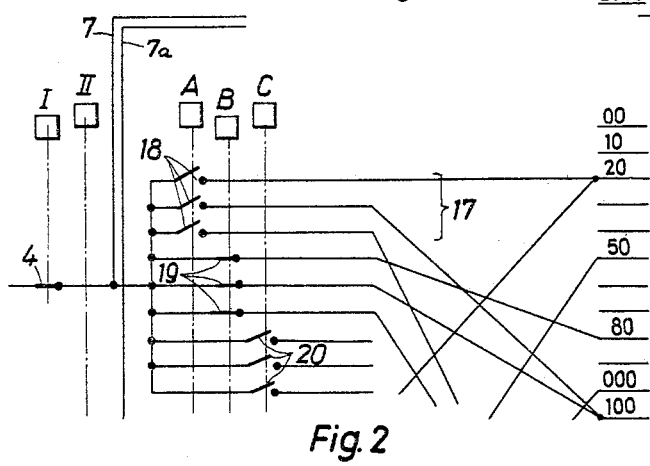
FIG. 2 is a fragmentary electrical schematic diagram of a modified form of the circuit of FIG. 1.

The diodes 14 can be omitted if each of the contacts 8 to 13 is replaced by three contacts that are actuated together, as shown in the modified arrangement of FIG. 2 where three contacts each, 18, 19 and 20 respectively, have been substituted for the contacts 8, 9 and 10 respectively. The branch circuits form groups here, one of which is designated with numeral 17, in FIG. 2.

The connections between the outputs of the diodes 14 and the outputs 00 to 2000 may be combined on a circuit board and designed so that in case of a rate change they can easily be changed in accordance with the new rate. The circuit board can also be made exchangeable in order to be replaced, in case of a rate change, by a circuit board connected in accordance with the new rate. This applies logically also to the variant according to FIG. 2.

Figures 3, 4:
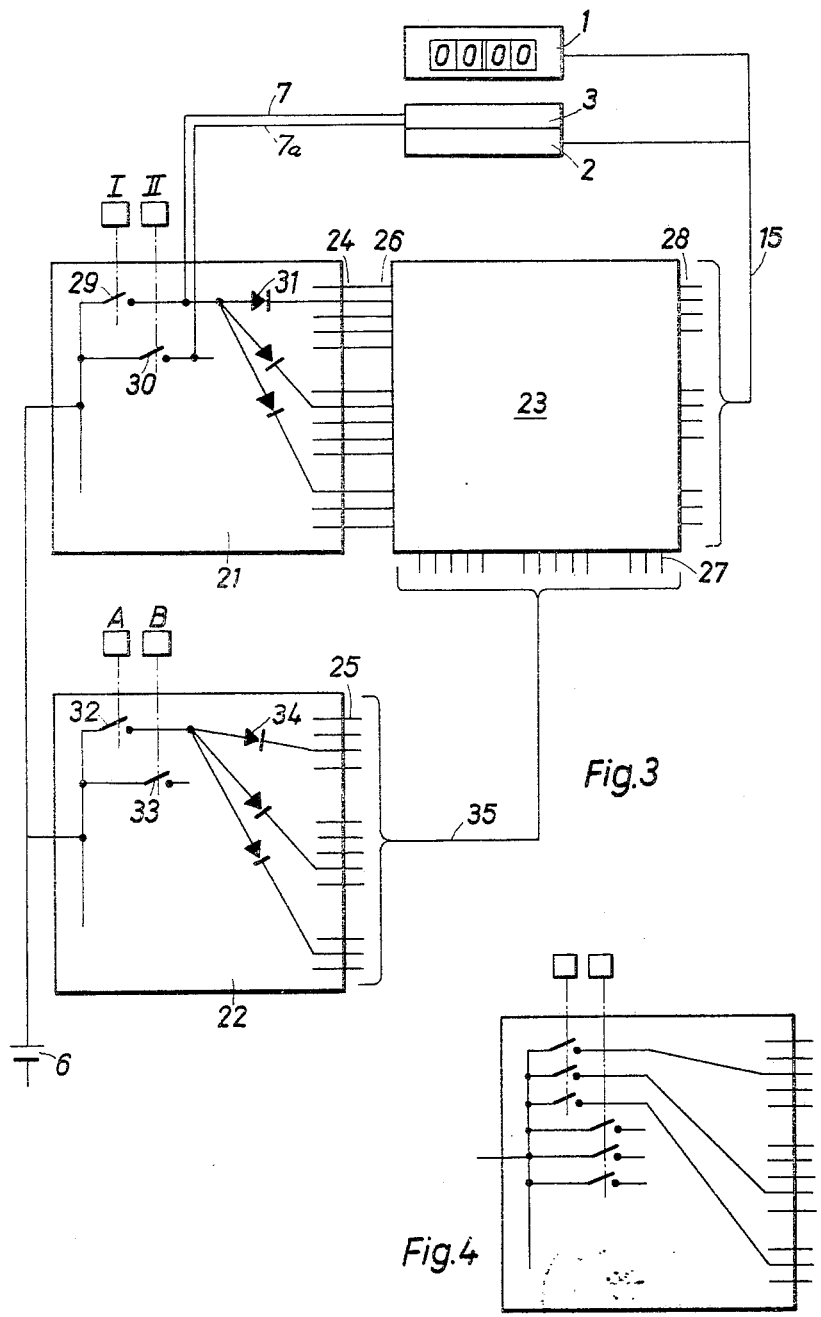
FIG. 3 is a partial schematic of another form of the circuit of the invention.
FIG. 4 is an electrical schematic diagram of a modified form of a portion of the circuit of FIG. 3.

The circuit layout of the invention, according to FIG. 3, is based on the usual rate system in which every fare is obtained by multiplying a number associated with the destination by a number associated with the kind of ticket to be printed for that destination. The former number may be a base fare or the number of rate kilometers or rate miles for the destination in question. In the latter case the multiplier is itself the product of the rate per kilometer or rate per mile and a number depending on the kind of ticket.

This example of the circuit for the determination of the fare comprises a first and a second assignment circuit 21 and 22 as well as a circuit 23 to carry out multiplication, which circuit is well known in the art. Exemplary prior art embodiments of multiplication circuits that can be utilized for circuit 23 are disclosed in "Digitale Rechenanlage," von Ambros P. Speiser, 2. edition, Springer-Verlag Berlin/Heidelberg/New York, 1967, pages 217 to 226 (section IV. 2.3. "Die Multiplikation") and in "Handbuch für Hochfrequenz- und Elektro-Techniker, vol. IV, Verlag für Radio-Foto-Kinotechnik GmbH., Berlin-Borsigwalde, 1957, pages 707 and 708 (section "Multiplikationstafel"). The first assignment circuit 21 has an output 24 for each unit of each decade of the multiplication factors predetermined for the destinations for the calculation of the fare. The second assignment circuit 22 has an output 25 for each unit of each decade of the multiplication factors predetermined for the kind of ticket for the calculation of the fare. The outputs 24 and 25 are connected to the inputs 26 and 27 of the circuit for the performance of multiplication, the outputs 28 of which, for the product of the multiplication which corresponds to the fare, are connected by means of the conductors 15 to the fare indicating device 1 and the fare printing mechanism 2.

By means of the selection keyboard I, II, etc., the normally open contact switches 29 and 30 of the assignment circuit 21 operable for the destination, are each assigned to a position or key of this selection keyboard, i.e., to a destination (other contact switches not shown, of this kind, are assigned to other key positions, not shown). Each of the contacts 29, 30, etc., is connected, on one side, to the current source 6 and on the other side with those of the outputs 24 which correspond to the multiplication factor depending on the destination, which is predetermined for the key position of the keyboard I, II, etc., assigned to the contact. These connections are shown in FIG. 3 only for the contact 29, and they contain one diode 31 each for the reason explained in connection with the circuit of FIG. 1.

The assignment circuit 22 has, by means of the selection keyboard, A, B, etc., contacts 32, 33, etc., which can be operated for the kind of ticket to be printed, and are assigned to one position each of this selecting device or keyboard (other contacts, not shown, of this kind, are assigned to other key positions not shown). Each of the contacts 32, 33, etc., is connected, on one side, to the current source 6 and on the other side, via one diode 34 each, with those of the assignment circuit outputs 25 which correspond to the multiplication factor depending on the kind of ticket to be printed, which is predetermined for the position of the keyboard A, B, etc., assigned to the contact. These connections are shown only for the contact 32 in FIG. 3, for sake of clarity. The diodes 34 serve here the same purpose as the diodes 31.

The operation of this circuit, the contacts of which are shown in the normally open or rest position, is as follows: After selection of the destination by means of the keyboard I, II, etc., the current from the current source 6 flows through the contacts 29, 30, etc., that is the particular contacts closed by means of the particular corresponding keys that are depressed, and also flows through the conductors 7, 7a, etc., respectively, to the destination printing mechanism 3 as well as, via the diodes 31, to those of the outputs 24 which correspond to the multiplication factor predetermined for the destination selected. From these outputs the current flows to the corresponding inputs 25 of the circuit 23. Similarly, a current flows from the current source 6, after selection of the kind of ticket by means of the keyboard A, B, etc., through the contact 32, 33, etc., that is closed by depression of the particular key selected, and through the diodes 34 to those of the outputs 25 which correspond to the multiplication factor predetermined for the kind of ticket selected, and from these outputs 25 via the conductors 35 to the inputs 27 of the circuit 23.

The circuit 23 forms from the currents which are fed to its inputs 26 and 27 and which correspond to the two multiplication factors, the multiplication product, and thus currents corresponding to the fare, which control the fare indicating device 1 and the fare printing mechanism 2, via conductor 15.

The diodes 31 and 34 in FIG. 3 may be omitted as was explained in connection with the diodes 14 in FIG. 1, with the aid of FIG. 2, if in the place of one contact switch, such as 29 or 32, connected to the diodes, there are substituted as many make-contact switches that can be operated together as there are connections provided by the circuit branch with the outputs 24 and 25, respectively, in FIG. 3. FIG. 4 shows this by means of the example of a circuit corresponding to the assignment circuit 22, with a plurality of switches, such as three, substituted for a single switch 32 and diode 34 circuit combination.

In one or both of the assignment circuits 21 and 22 the connections between the diodes 31 and 34, respectively, and the outputs 24 and 25, respectively, can be combined in a circuit board and designed so that they can be changed easily in cast of a ticket charge rate change, or the circuit board can be made exchangeable in order to be replaced, in case of rate changes, by a circuit board with connections corresponding to the new rates. This applies logically also if the assignment circuit has additional contact switches according to the form shown in FIG. 4, in place of the diodes.

Figure 5:
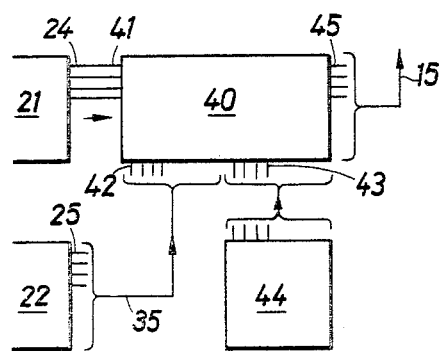
FIG. 5 is a partial block diagram showing of another modified from of a portion of the circuit of FIG. 3.

In the modified form of a portion of the circuit of FIG. 3, as shown in FIG. 5, the circuit presupposes that each fare output is the result of multiplication of three factors, in particular, the product of a number of rate kilometers, the price per kilometer and a factor depending on the kind of ticket. Here, the circuit 40 for carrying out the multiplication in FIG. 5 differs from the circuit 23, in FIG. 3, in that it has in addition to an input 41 for the multiplication factor depending on the destination and an input 42 for the multiplication factor depending on the kind of ticket, a third input 43 for the price per kilometer. Circuits for carrying out the multiplying function of circuits 23 and 40 are known in the art and are disclosed for instance in the publications mentioned under the discussion of FIG. 3 with respect to multiplication circuit 23. The inputs 41 and 42 of this circuit in FIG. 5 correspond to the inputs 26 and 27 of the circuit 23 in FIG. 3 from the assignment circuits 21 and 22. The connections to circuits 21 and 22 are the same as shown in FIG. 3 and are eliminated from FIG. 5, as this is a schematic of only a portion of FIG. 3. To the inputs 43 are connected the outputs of a circuit 44 which furnish currents corresponding to the price per kilometer. The outputs 45 of the circuit 40 correspond to the outputs 28 of the circuit 23 in FIG. 3 and are, like the former, connected to conductors 15 which lead to the fare indicating device and to the fare printing mechanism which are not shown in FIG. 5. The circuit 44 can be made so that the price per kilometer can, for instance, be set by means of two decade switches arranged similar to circuit 22 of FIG. 3 or that the connections depending on the price per kilometer are easily changeable by other means or are arranged on an exchangeable circuit board.

All examples of modifications of the basic circuit of the invention described may be equipped with a coin collecting device. In the forms of the circuit having a circuit to carry out multiplication (23 in FIG. 3, 40 in FIG. 5), this circuit can control, through suitable design, additionally an indicating device for the remaining balance after each insertion of a coin, or in the case of a coin collecting device with coin return for the difference between the amount paid and the fare due, the coin return device.

Figure 6:
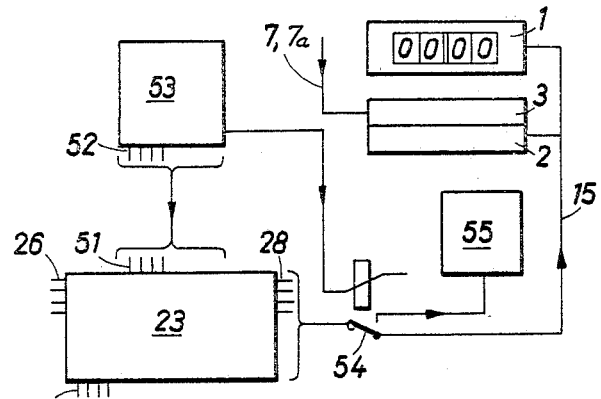
FIG. 6 is a schematic block diagram of a further modified form of the invention showing circuit portions corresponding to FIGS. 3 or 5, and with the addition of a coin collecting device which is an indicating device for the balance remaining after insertion of a coin, or a coin return device for the difference between the amount paid and the price of the fare.

FIG. 6 shows a partial block diagram of a part of a ticket printer circuit according to FIG. 3 with the addition of this feature, where the circuit 40 with the circuit 44 according to FIG. 5 can also take the place of the circuit 23, although they are not shown. According to FIG. 6, the circuit 23 for carrying out multiplication is additionally designed for counting backwards, such circuitry being well known in the art, and for control of the backward counting process it is provided with the additional inputs 51, which are connected with the outputs 52 of the coin storing mechanism 53 of the coin collecting device. In the rest or deenergized position of a relay 54, the outputs 28 are connected via the conductor 15 with the fare indicating device 1 and the fare printing mechanism 2. In the operating or energized position of relay 54 the outputs 28 are connected with an indicating device 55 for the remainder amount of the fare due. The first phase of the operation of this circuit is the operation previously described in connection with FIG. 3. After indication of the fare on the fare indicating device 1, as soon as the first coin is inserted in payment of the fare, the relay 54 is energized and connects the outputs 28 with the indicating device for the remainder amount due 55, and after the coin inserted has been tested, the coin storage mechanism 53 causes the circuit 23 to count backwards by the amount of this coin, whereupon the device 55 indicates the amount of the balance of the fare that is due. This counting backwards takes place upon the insertion of each further coin, whereupon the balance remaining is indicated each time. Instead of after the insertion of the first coin, the relay 54 can also be actuated after the completion of the multiplication process and after the lapse of the time required for the control of the devices 1 and 2.

The partial system block diagram shown in FIG. 6 applies also to a form of the circuit with a coin return device for returning the amount of the difference between the amount paid and the fare that is due, wherein the circuit 23 is designed, according to known circuitry, for the determination of the difference between the paid amount determined by the coin storage mechanism 53 and the fare determined and displayed on indicator 1, the inputs 51 being minuend inputs and the coin return device taking the place of the indicating device 55.

While the invention has been shown and described in certain preferred embodiments it is realized that modifications can be made without departing from the spirit of the invention.

I claim:

1. A ticket printer circuit comprising, a first selecting device for selecting the ticket destination, a second selecting device for selection the kind of ticket, a circuit controlled by the said first and second selecting devices for the determination of the fare predetermined for the selected combination of destination and kind of ticket, a common current source, said circuit for the determination of the fare having an output for each unit of each decade of the fare, first circuit completing contacts in said circuit operable by said first selecting device, said first contacts corresponding to individually assigned destination positions, and each of which is connected on one side to said common current source, second circuit completing contacts operable by said second selecting device, said second circuit completing contacts assigned to individual corresponding positions of said second selecting device, each of said first contacts connected on the other side through a plurality of said second circuit completing contacts with said outputs of the circuit for the determination of the fare which correspond to the fare for the combination of the assigned positions of said first and second circuit completing contacts, and a fare printing mechanism connected with said outputs for control by said circuit.

2. A ticket printer circuit as set forth in claim 1, including diode means, a plurality of branch circuits, each of said first contacts connected on said other side to an individual branch circuit, each circuit of said branch circuit containing a said second circuit completing contact which is assigned to a corresponding position of said second selecting device, and is connected by said diode means with the said circuit outputs which correspond to the fare for the combination of the assigned positions of the corresponding first and second selecting devices.

3. A ticket printer circuit as set forth in claim 1, including a plurality of circuit groups for each of said first circuit completing contacts, said circuit groups for each first contact connected to a junction, each of said first contacts on said other side connected to said corresponding junction, each circuit group including a plurality of branch circuits, each branch circuit of each circuit group including a said second circuit completing contact, and the second circuit completing contacts of each group commonly connected for actuation by an individual position of said second selecting device, and said branch circuits connected with said outputs corresponding to the fare for the combination of the assigned positions of the said selecting devices.

4. A ticket printer circuit comprising, a first selecting device for selecting the ticket destination, a second selecting device for selecting the kind of ticket, a circuit controlled by the said first and second selecting devices for the determination of the fare predetermined for the selected combination of destination and kind of ticket, said circuit for the determination of the fare having a first and a second assignment circuit, and a circuit to carry out multiplication, a current source, said first and second selecting devices having individual operable positions, first contacts in said first assignment circuit operable by means of said first selecting device, each first contact operably connected to an individual operable position of the same, said first assignment circuit having an output for each unit of each decade of multiplication factors which are predetermined for the fare calculation for the individual destinations, second contacts in said second assignment circuit operable by means of said second selecting device, each second contact operably connected to an individual operable position of the same, said second assignment circuit having an output for each unit of each decade of multiplication factors which are predetermined for the fare calculation for the individual kinds of tickets, each of said first and second contacts of each said first and second assignment circuits respectively is connected on one side to said current source and on the other side respectively to those outputs which correspond to the multiplication factors predetermined for the position assigned, said circuit to carry out multiplication having input means and output means, a fare printing mechanism, the said outputs of the first and second assignment circuits connected to said input means, and said output means of said multiplication circuit operatively connected to control said fare printing mechanism.

5. A ticket printer circuit as set forth in claim 4, including diode means, and wherein in at least one of the first and second assignment circuits each individual position of the associated selecting device is operatively connected to a said first or second contact respectively which is connected on the other side via said diode means with those said outputs which correspond to the multiplication factor assigned to the position.

6. A ticket printer circuit as set forth in claim 4, in which in at least one of the said assignment circuits each individual position of the associated selecting device is operatively connected to several said corresponding contacts operable together, and each of said contacts is connected with one of the assignment circuit outputs which correspond to the multiplication factor for the calculation of the fare, assigned to the position.

7. A ticket printer circuit as set forth in claim 4, in which the said circuit for the performance of multiplication is designed for the multiplication of three factors, the third of which is determined by a circuit unit which is changeable or exchangeable for changing the ticket charge rate.

8. A ticket printer circuit as set forth in claim 4, including a coin collecting device for receiving coins in the amount of the fare information supplied by the circuit for the determination of the fare, a balance due indicator, in which the circuit for the performance of multiplication is additionally a backwards, counting circuit, control means for connecting said backwards counting circuit to said balance due indicator, wherein the coin collecting device is connected to furnish the fare received information to the backwards counting circuit to cause it to count backwards by the amounts of the coins inserted therein, said control means operable by said coin collecting device, and said backwards counting circuit connected to operate said indicating device to indicate the amount remaining to be paid after each insertion of a coin.

9. A ticket printer circuit as set forth in claim 4, including a coin collecting device which is connected to receive the fare information from the device for the determination of the fare and is equipped with a return device for the difference amount between the amount paid and the fare, in which the circuit for the performance of multiplication additionally is constructed for the determination of the balance of the amount due, and is connected for the control of the return device.

References Cited
UNITED STATES PATENTS

| 2,668,009 | 2/1954 | Schmidt | 235—159 X |
| 3,215,240 | 11/1965 | Keim et al. | 194—2 |
| 3,253,132 | 5/1966 | Pendleton | 235—160 X |
| 3,281,794 | 10/1966 | Townsend | 235—160 X |
| 3,321,058 | 5/1967 | Brooks | 194—2 |
| 3,321,610 | 5/1967 | Currie et al. | 235—160 |

SAMUEL F. COLEMAN, Primary Examiner

U.S. Cl. X.R.

235—160